(12) United States Patent
Hwang et al.

(10) Patent No.: US 12,438,205 B2
(45) Date of Patent: Oct. 7, 2025

(54) BATTERY SYSTEM WITH HEATING ELEMENT AND METHOD OF CONTROLLING THE SAME

(71) Applicant: SAMSUNG SDI CO., LTD., Yongin-si (KR)

(72) Inventors: Kumyul Hwang, Yongin-si (KR); Woongbin Kim, Yongin-si (KR); Junseop Kim, Yongin-si (KR); Yujeong Jeon, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 816 days.

(21) Appl. No.: 17/562,380

(22) Filed: Dec. 27, 2021

(65) Prior Publication Data
US 2022/0311064 A1    Sep. 29, 2022

(30) Foreign Application Priority Data
Mar. 26, 2021   (KR) ........................ 10-2021-0039695

(51) Int. Cl.
*H01M 10/44*   (2006.01)
*H01M 10/48*   (2006.01)
*H02J 7/00*    (2006.01)

(52) U.S. Cl.
CPC ....... *H01M 10/443* (2013.01); *H01M 10/486* (2013.01); *H02J 7/00309* (2020.01)

(58) Field of Classification Search
CPC ................................................. H01M 10/443
(Continued)

(56) References Cited

U.S. PATENT DOCUMENTS 9,071,056 B2   6/2015 Yang et al.
10,647,211 B2  5/2020 Ogaki et al.
(Continued)

FOREIGN PATENT DOCUMENTS

CN   108028443 A   5/2018
CN   109755676 A   5/2019
(Continued)

OTHER PUBLICATIONS

Korean Notice of Allowance dated Jan. 31, 2024, of the corresponding KR Patent Application No. 10-2021-0039695.
(Continued)

*Primary Examiner* — Yalkew Fantu
(74) *Attorney, Agent, or Firm* — Lee IP Law, P.C.

(57) ABSTRACT

Provided is a battery system including a battery management module, a battery module, and a controller. The battery management module includes a main switch between an external terminal and a battery terminal, and a heating switch between the external terminal and a heating terminal. The battery module includes a cell, a heating element, and a control switch connected to the heating element. The controller is configured to detect a connection with a charger, detect a temperature of the cell, when the temperature is lower than a first value, turn off the main switch and turn on the heating switch and the control switch to supply heating power from the charger to the heating element, and when the temperature becomes higher than a second value by the heating element, turn off the heating switch and turn on the main switch to supply charging power from the charger to the cell.

12 Claims, 12 Drawing Sheets

(58) Field of Classification Search
USPC .......................................................... 320/153
See application file for complete search history.

(56) References Cited

U.S. PATENT DOCUMENTS

| | | | |
|---|---|---|---|
| 11,114,708 B2 | 9/2021 | Kim et al. | |
| 11,677,110 B2 | 6/2023 | Hong et al. | |
| 2008/0120050 A1* | 5/2008 | Iwane | G01R 31/392 |
| | | | 320/136 |
| 2012/0032638 A1 | 2/2012 | Jung | |
| 2017/0358933 A1* | 12/2017 | Becker | H01M 10/633 |
| 2018/0281618 A1 | 10/2018 | Ogaki et al. | |
| 2019/0207406 A1* | 7/2019 | Matthey | H02J 7/00309 |
| 2021/0036388 A1* | 2/2021 | Liu | H01M 10/615 |

FOREIGN PATENT DOCUMENTS

| | | |
|---|---|---|
| CN | 110970688 A | 4/2020 |
| CN | 111129660 A | 5/2020 |
| EP | 3872953 * | 1/2021 |
| JP | 5462711 | 1/2014 |
| JP | 6634453 B2 | 1/2020 |
| JP | 2020-517082 A | 6/2020 |
| KR | 10-2013-0049706 A | 5/2013 |
| KR | 10-2018-0131699 | 12/2018 |
| KR | 10-2018-0135675 A | 12/2018 |

OTHER PUBLICATIONS

European Search Report dated Aug. 25, 2022.
Korean Office Action dated Jun. 29, 2023, for the corresponding KR Patent Application No. 10-2021-0039695.
Chinese Office action dated May 28, 2025, for corresponding CN Patent Application No. 202210305864.9.

* cited by examiner

BATTERY SYSTEM WITH HEATING ELEMENT AND METHOD OF CONTROLLING THE SAME

CROSS-REFERENCE TO RELATED APPLICATION

This application is based on and claims priority under 35 U.S.C. § 119 to Korean Patent Application No. 10-2021-0039695, filed on Mar. 26, 2021, in the Korean Intellectual Property Office, the disclosure of which is incorporated by reference herein in its entirety.

BACKGROUND

1. Field

One or more embodiments relate to a battery system and a method of controlling the same.

2. Description of the Related Art

Lead-acid batteries may be used in light electric vehicles (LEVs) such as golf carts, industrial cleaners, forklifts, and aerial work platforms, but lithium-ion batteries instead of lead-acid batteries are used for environmental problems and increased energy efficiency. Due to the nature of a product operating in an outdoor environment, LEVs should be reliable in low and high temperature environments ranging from about −40° C. to 40° C. Also, fast charging at 1C-rate or higher may be desirable to enhance the usability of the product.

SUMMARY

Embodiments are directed to a battery system, including: a battery management module including an external terminal, a battery terminal, a heating terminal, a main switch between the external terminal and the battery terminal, and a heating switch between the external terminal and the heating terminal; at least one battery module including at least one battery cell connected to the battery terminal, a heating element, and a control switch between the heating element and the heating terminal; and a controller configured to detect connection with a charger, and to detect a cell temperature of the at least one battery cell. When the cell temperature is lower than a first reference value, the controller may turn off the main switch and turn on the heating switch and the control switch to supply heating power from the charger to the heating element, and, when the cell temperature is higher than a second reference value, the controller may turn off the heating switch and turn on the main switch to supply charging power from the charger to the at least one battery cell.

The controller may include: a microcontroller mounted on the battery management module and configured to control the main switch and the heating switch; and at least one analog front end respectively mounted on the at least one battery module and configured to detect the cell temperature, transmit the detected cell temperature to the microcontroller, and output a control signal to the control switch according to control of the microcontroller.

The control signal may be a pulse width modulation signal, and the microcontroller may be configured to determine a duty ratio of the control signal according to the cell temperature.

The at least one battery module may include: a first battery module including at least one first battery cell, a first heating element, and a first control switch between the first heating element and the heating terminal; and a second battery module including at least one second battery cell, a second heating element, and a second control switch between the second heating element and the heating terminal.

The at least one first battery cell and the at least one second battery cell may be connected to each other in series, the controller may be configured to request the charger to supply a heating voltage when one of a first cell temperature of the at least one first battery cell and a second cell temperature of the at least one second battery cell is lower than the first reference value, and the controller may be configured to request the charger to supply a higher charging voltage than the heating voltage when all of the first cell temperature and the second cell temperature are higher than the second reference value.

When the first cell temperature of the at least one first battery cell reaches the second reference value and the second cell temperature of the at least one second battery cell is lower than the second reference value, the controller may be configured to output a first control signal having a first duty ratio to the first control switch and output a second control signal having a second duty ratio higher than the first duty ratio to the second control switch.

The second reference value may be equal to or higher than the first reference value.

The heating element may be a film heater having a plurality of regions with different heating values per unit area, and the at least one battery cell may include a plurality of battery cells arranged on the film heater.

A heating value per unit area of a central region of the film heater may be lower than a heating value per unit area of an edge region of the film heater.

The heating element may include a first film heater, and a second film heater that surrounds at least a portion of the first film heater, the at least one battery module may include a first control switch between the first film heater and the heating terminal, and a second control switch between the second film heater and the heating terminal, and the controller may be configured to output a second control signal having a higher duty ratio than a duty ratio of a first control signal output to the first control switch, to the second control signal.

Embodiments are also directed to a method of controlling the battery system of an embodiment, the method including: detecting a connection with a charger; detecting a cell temperature of the at least one battery cell; when the cell temperature is lower than the first reference value, operating the controller to turn off the main switch and turn on the heating switch and the control switch so as to supply the heating power from the charger to the heating element; and, when the cell temperature is higher than the second reference value, operating the controller to turn off the heating switch and turn on the main switch so as to supply the charging power from the charger to the at least one battery cell.

The supplying of the heating power from the charger to the heating element may include: detecting the cell temperature that is lower than the first reference value; turning off the main switch; requesting the charger to output a heating voltage; detecting the heating voltage applied to the external terminal; turning on the heating switch; and adjusting a duty ratio of a control signal for controlling the control switch.

The supplying of the charging power from the charger to the at least one battery cell may include: detecting that the cell temperature is maintained to be higher than the second reference value for a preset time; turning off the heating switch; requesting the charger to output a charging voltage; detecting the charging voltage applied to the external terminal; and turning on the main switch.

BRIEF DESCRIPTION OF THE DRAWINGS

Features will become apparent to those of skill in the art by describing in detail example embodiments with reference to the attached drawings in which.

DETAILED DESCRIPTION

Figure 1:
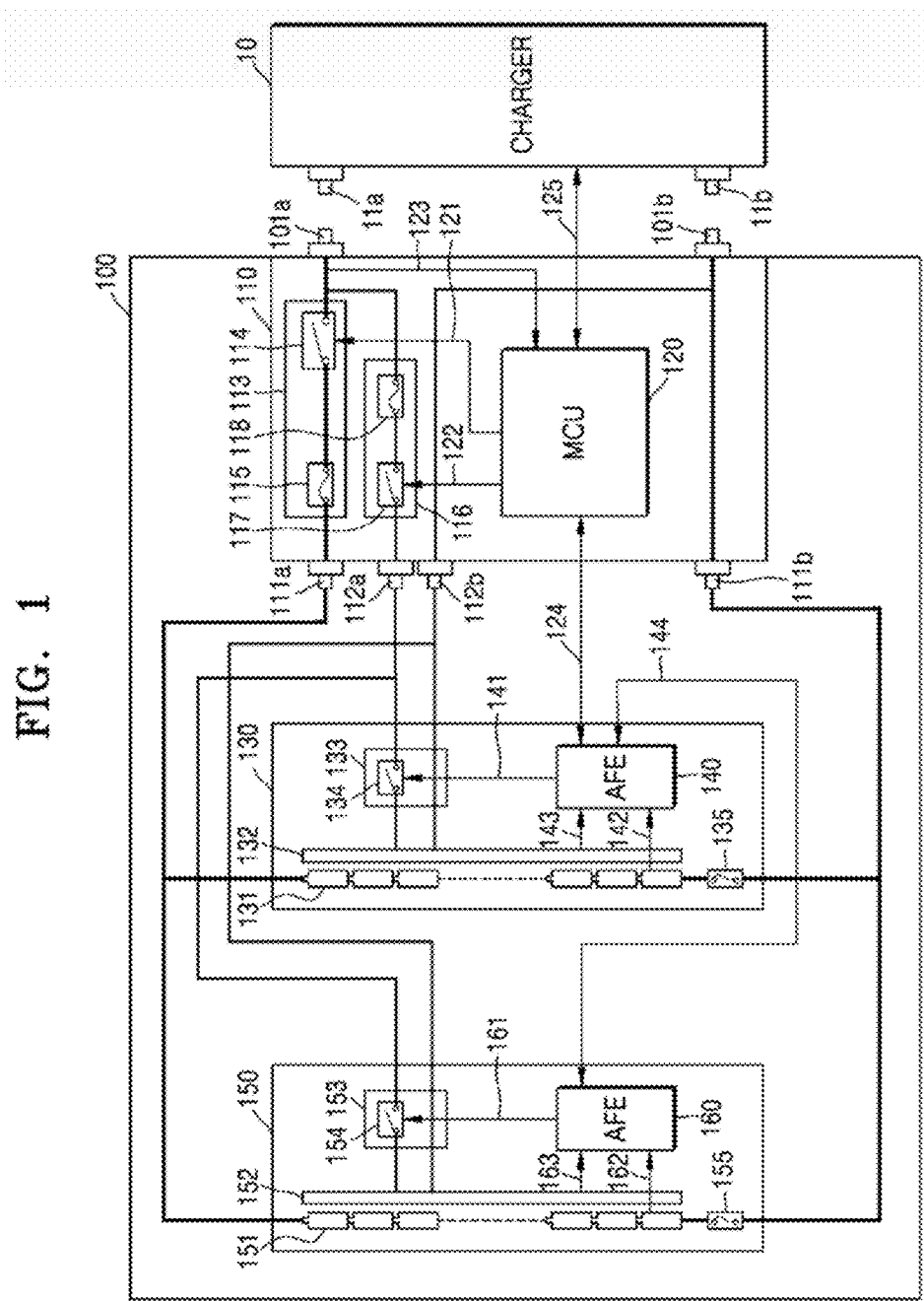
FIG. 1 illustrates a battery system according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

The terms used in the present specification are only used to describe specific embodiment, and are not intended to limit the present disclosure. The singular forms "a," "an" and "the" are intended to include the plural forms as well, unless the context clearly indicates otherwise. In the present specification, it is to be understood that the terms such as "including" or "having," etc., are indented to indicate the existence of the features, numbers, steps, actions, components, parts, or combination thereof disclosed in the specification, and are not intended to preclude the possibility that one or more other features, numbers, steps, actions, components, parts, or combinations thereof may exist or may be added. It will be understood that although the terms "first", "second", etc. may be used herein to describe various components, these components should not be limited by these terms. These components are only used to distinguish one component from another.

FIG. 1 illustrates a battery system according to an example embodiment.

Referring to FIG. 1, a battery system 100 may include a battery management module 110, at least one of battery modules 130 and 150, and controllers 120, 140, and 160. The battery system 100 may be charged by being connected to a charger 10, discharged by being connected to a load.

The battery management module 110 may include external terminals 101a and 101b, battery terminals 111a and 111b, heating terminals 112a and 112b, a main switch 114 between the external terminal 101a and the battery terminal 111a, and a heating switch 117 between the external terminal 101a and the heating element 112a.

The battery modules 130 and 150 may include a first battery module 130 and a second battery module 150.

The first battery module 130 may include at least one first battery cell 131 connected to the battery terminals 111a and 111b, a first heating element 132, and a first control switch between the first heating element 132 and the heating terminal 112a.

The second battery module 150 may include at least one second battery cell 151 connected to the battery terminals 111a and 111b, a second heating element 152, and a second control switch 154 between the second heating element 152 and the heating terminal 112a.

In FIG. 1, the battery system 100 includes two battery modules 130 and 150.

However, the battery system 100 may include only one battery module. or may include three or more battery modules, which may be connected in series or in parallel.

The controllers 120, 140, and 160 may include a microcontroller 120 and at least one of analog front ends 140 and 160.

In FIG. 1, two analog front ends 140 and 160 are included in the battery system 100 corresponding to two battery modules 130 and 150. However, the number of analog front ends may correspond to the number of battery modules.

The microcontroller 120 may be mounted on the battery management module 110, and the first and second analog front ends 140 and 160 may be mounted on the first and second battery modules 130 and 150, respectively.

The external terminals 101a and 101b may output power stored in the battery system 100 to an external device such as a load, or may receive power to be stored in the battery system 100 from an external device such as the charger 10. The external terminals 101a and 101b may be configured to be connected to charging terminals 11a and 11b of the charger 10. In an example, the first external terminal 101a is positive, and the second external terminal 101b is negative, but this is merely an example.

The battery terminals 111a and 111b may be configured to be connected to the first and second battery modules 130 and 150. The first battery cell 131 of the first battery module 130 and the second battery cell 151 of the second battery module 150 may be connected in parallel between the battery terminals 111a and 111b. The first battery cell 131 and the second battery cell 151 may receive a charging current and output a discharging current through the battery terminals 111a and 111b.

A first switch circuit 113 may be arranged between the external terminal 101a and the battery terminal 111a. The first switch circuit 113 may include a main switch 114 and a main fuse 115.

The main switch 114 may be connected between the external terminal 101a and the battery terminal 111a. The main switch 114 may be controlled by a main control signal 121 output by the microcontroller 120.

The first switch circuit 113 may include a current sensor, and the current sensor may detect the charging and discharging currents input and output to/from the external terminals 101a and 101b, thereby providing the sensing data 123 to the microcontroller 120. The first switch circuit 113 may include a voltage sensor that detects a voltage between the external terminals 101a and 101b, and the voltage sensor may provide sensing data 113.

According to another example, the first switch circuit 113 may be arranged between the external terminal 101b and the battery terminal 111b.

The heating terminals 112a and 112b may be configured to be connected to the first and second battery modules 130 and 150. The first heating element 132 of the first battery module 130 and the second heating element 152 of the second battery module 150 may be connected in parallel between the heating terminals 112a and 112b.

According to another example, the heating terminal 112b may be omitted, and the first heating element 132 and the second heating element 132 and the second heating element 152 may be connected between the heating element 112a and the battery terminal 111b.

A second switch circuit 116 may be arranged between the second terminal 101a and the heating terminal 112a. The second switch circuit 116 may include a heating switch 117 and a fuse 118.

The heating switch 117 may be connected between the external terminal 101a and the heating terminal 112a. The heating switch 117 may be controlled by a heating control signal 122 output by the microcontroller 120.

According to another example, the second switch circuit 116 may be arranged between the external terminal 101b and the heating terminal 112b.

The microcontroller 120 may receive the sensing data 123, may output a main control signal 121 for controlling the main switch 114, and may output a heating control signal 122 for controlling the heating switch 117. The microcontroller 120 may communicate with the first and second analog front ends 140 and 160 through a first communication line 124. The first communication line 124 may be a communication line for performing a controller area network (CAN) communication.

The microcontroller 120 may communicate with the charger 10 through a second communication line 125. The microcontroller 120 may detect connection with the charger 10 through the second communication line 125, and may request the charger 10 to output a voltage so as to operate in a charging mode. For example, the microcontroller 120 may request the charger 10 to supply a heating voltage or may request the charger 10 to supply a charging voltage. According to another example, the microcontroller 120 may detect that a voltage is being applied to the external terminals 101a and 101b through the sensing data 123, thereby operating in the charging mode.

According to an example, the microcontroller 120 may be awakened through a signal output by the charger 10 through the second communication line 125. According to another example, the microcontroller 120 may be awakened in response to the voltage applied to the external terminals 101a and 101b.

The first and second battery cells 131 and 151 may be rechargeable secondary batteries. For example, the first and second battery cells 131 and 151 may be lithium-ion batteries. In other implementations, the first and second battery cells 131 and 151 may include a nickel-cadmium battery, a nickel metal hydride battery (NiMH), a lithium polymer battery, and the like.

The first battery cells 131 may be connected to the battery terminals 111a and 111b, and a fuse 135 may be connected to the first battery cells 131 in series. The second battery cells 151 may be connected to the battery terminals 111a and 111b, and a fuse 155 may be connected to the second battery cells 151 in series.

In FIG. 1, each of the first battery cells 131 and the second battery cells 151 are connected in series. However, this is just an example, and the first battery cells 131 and the second battery cells 151 may be connected to each other in parallel or in series and in parallel. The number of first battery cells 131 and the number of second battery cells 151 is not limited to the examples described herein.

The first and second heating elements 132 and 152 may be connected between the heating terminals 112a and 112b, and may be elements that generate heat by dissipating heating power supplied through the heating elements 112a and 112b.

The first and second heating elements 132 and 152 may be, e.g., film heaters. The film heaters may include a heating element pattern arranged on an insulating film. The heating element may include, for example, a metal heating element, a non-metal heating element, other heating elements, or the like.

When a voltage is applied to the heating element pattern, heat may be emitted to increase the temperature of the first and second battery cells 131 and 151. The first and second heating elements 132 and 152 may be arranged adjacent to the first and second battery cells 131 and 151.

First and second control circuits 133 and 153 may be respectively arranged to control the operation of the first and second heating elements 132 and 152. The first control circuit 133 may be arranged between the first heating element 132 and the heating terminal 112a, and the second control circuit 153 may be arranged between the second heating element 152 and the heating terminal 112a. The first control circuit 133 may include a first control switch 134 controlled by the first control signal 141 output by the first analog front end 140, and the second control circuit 153 may include a second control switch 154 controlled by the second control signal 161 output by the second analog front end 160.

The first control signal 141 and the second control signal 161 may be, e.g., pulse width modulation (PWM) signals having a duty ratio. The first and second analog front ends 140 and 160 may adjust the duty ratio of the first and second control signals 141 and 161, thereby adjusting a heating value of heat generated by the first and second heating elements 132 and 152. The duty ratio of the first and second control signals 141 and 161 may be determined by the microcontroller 120.

The first and second analog front ends 140 and 160 may receive battery sensing data 142 and 162 and heater sensing data 143 and 163.

The battery sensing data 142 and 162 may include first and second cell voltage values of the first and second battery cells 131 and 151, first and second cell temperature values of the first and second battery cells 131 and 151, and cell current values of the first and second battery cells 131 and 151.

The heating sensing data 143 and 163 may include the first and second heater temperatures of the first and second heating elements 132 and 152 and heater current values of the first and second heating element 132 and 152.

The first and second battery modules 130 and 150 may include a cell temperature sensor for detecting first and second cell temperatures and a heater temperature sensor for detecting first and second heater temperatures, respectively. The first and second battery modules 130 and 150 may include a cell current sensor for detecting cell current values of the first and second battery cells 131 and 151, and a heater current sensor for detecting heater current values of the first and second heating elements 132 and 152, respectively.

The first and second analog front ends 140 and 160 may communicate with each other through a third communication line 144. The third communication line 144 may be a communication line for performing a CAN communication. The CAN communication may be performed between the microcontroller 120 and the first and second analog front ends 140 and 160 through the first and third communication lines 124 and 144. The first and second analog front ends 140 and 160 may transmit the battery sensing data 142 and 162 and the heater sensing data 143 and 163 to the microcontroller 120 through the first and third communication lines 124 and 144. The microcontroller 120 may transmit control instructions to the first and second analog front ends 140 and 160 through the first and third communication lines 124 and 144. The control instructions may be, for example, instructions for adjusting the duty ratio of the first and second control signals 141 and 161.

The microcontroller 120 may detect connection with the charger 10. For example, the microcontroller 120 may detect connection with the charger 10 through the second communication line 125. The microcontroller 120 may detect first and second cell temperatures of first and second battery cells through the battery sensing data 142 and 162 received from the first and second analog front ends 140 and 160.

The microcontroller 120 may turn off the main switch 114 and turn on the heating switch 117 when the first and second cell temperatures are lower than a first reference value. According to an example, when any one of the first and second cell temperatures is lower than the first reference value, the microcontroller 120 may turn off the main switch 114 and turn on the heating switch 117. For example, the first reference value may be 0 degrees Celsius. However, the first reference value may be set to a temperature lower than or higher than 0 degrees Celsius according to the temperature characteristics of the first and second battery cells 131 and 151. Turning off the main switch 114 means that the main switch 114 is opened so that the external terminal 101a and the battery terminal 111a are insulated from each other. Turning on the heating switch 117 means that the heating switch 117 is shorted or closed so that the external terminal 101a and the heating terminal 112a are electrically connected to each other.

When the first and second cell temperatures are lower than the first reference value, the microcontroller 120 may request the charger 10 to supply heating power before turning on the heating switch 117. The charger 10 may output a heating voltage to the external terminals 101a and 101b in response to the request of the microcontroller 120.

The microcontroller 120 may detect the heating voltage applied to the external terminals 101a and 101b and then may turn on the heating switch 117. In this case, the main switch 114 may be in a turned off state.

Also, the microcontroller 120 may turn on the first and second control switches 134 and 154 through the first and second analog front ends 140 and 160, thereby supplying the heating power from the charger 10 to the first and second heating elements 132 and 152. The microcontroller 120 may determine the duty ratio of the first and second control signals 141 and 161 output by the first and second analog front ends 140 and 160 to control the first and second control switches 134 and 154, based on the first and second cell temperatures.

For example, when the first cell temperature is higher than the second cell temperature, the microcontroller 120 may determine the duty ratio of the first control signal 141 to be lower than the duty ratio of the second control signal 161. For example, when the first cell temperature reaches a second reference value in a state in which the second cell temperature does not reach the second reference value, the microcontroller 120 may transmit a control instruction for reducing the duty ratio of the first control signal 141 to the first analog front end 140. The duty ratio of the first control signal 141 may be lower than the duty ratio of the second control signal 161.

When the first and second cell temperatures are increased by the first and second heating elements 132 and 152 and the first and second cell temperatures are higher than the second reference value, the microcontroller 120 may be configured to supply charging power from the charger 10 to the first and second battery cells 131 and 151 by turning off the heating switch 117 and turning on the main switch 114. According to an example, when the first and second cell temperatures are higher than the second reference value, the microcontroller 120 may turn off the heating switch 117 and turn on the main switch 114. The second reference value may be higher than the first reference value and may be, for example, 5 degrees Celsius. However, the second reference value may be set to be lower than or higher than 5 degrees Celsius according to temperature characteristics of the first and second battery cells 131 and 151. In an example, the second reference value may be equal to the first reference value.

According to an example, the voltage of the charging power and the voltage of the heating power may be the same. According to another example, the voltage of the charging power and the voltage of the heating power may be different from each other, and for example, the voltage of the charging power may be higher than the voltage of the heating power.

According to another example, when the first and second cell temperatures are higher than the second reference value, the microcontroller 120 may turn off the heating switch 117 and may request the charger 10 to supply the charging power. The charger 10 may output the charging voltage to the external terminals 101a and 101b in response to the request of the microcontroller 120. The microcontroller 120 may detect the charging voltage applied to the external terminals 101a and 101b and then may turn on the main switch 114.

As described above, according to an example, when the first and second cell temperatures are equal to or higher than a preset first reference value, charging of the first and second battery cells 131 and 151 may be performed. Thus, as the first and second battery cells 131 and 151 are charged in a low temperature state, rapid deterioration of the first and second battery cells 131 and 151 may be prevented.

Also, according to an example, the heating power for increasing the first and second cell temperatures of the first and second battery cells 131 and 151 may not be supplied by the first and second battery cells 131 and 151, but instead may be supplied from the charger 10. Thus, a case in which the first and second battery cells 131 and 151 are discharged or overdischarged to increase the first and second cell temperatures, may be prevented.

Figure 2:
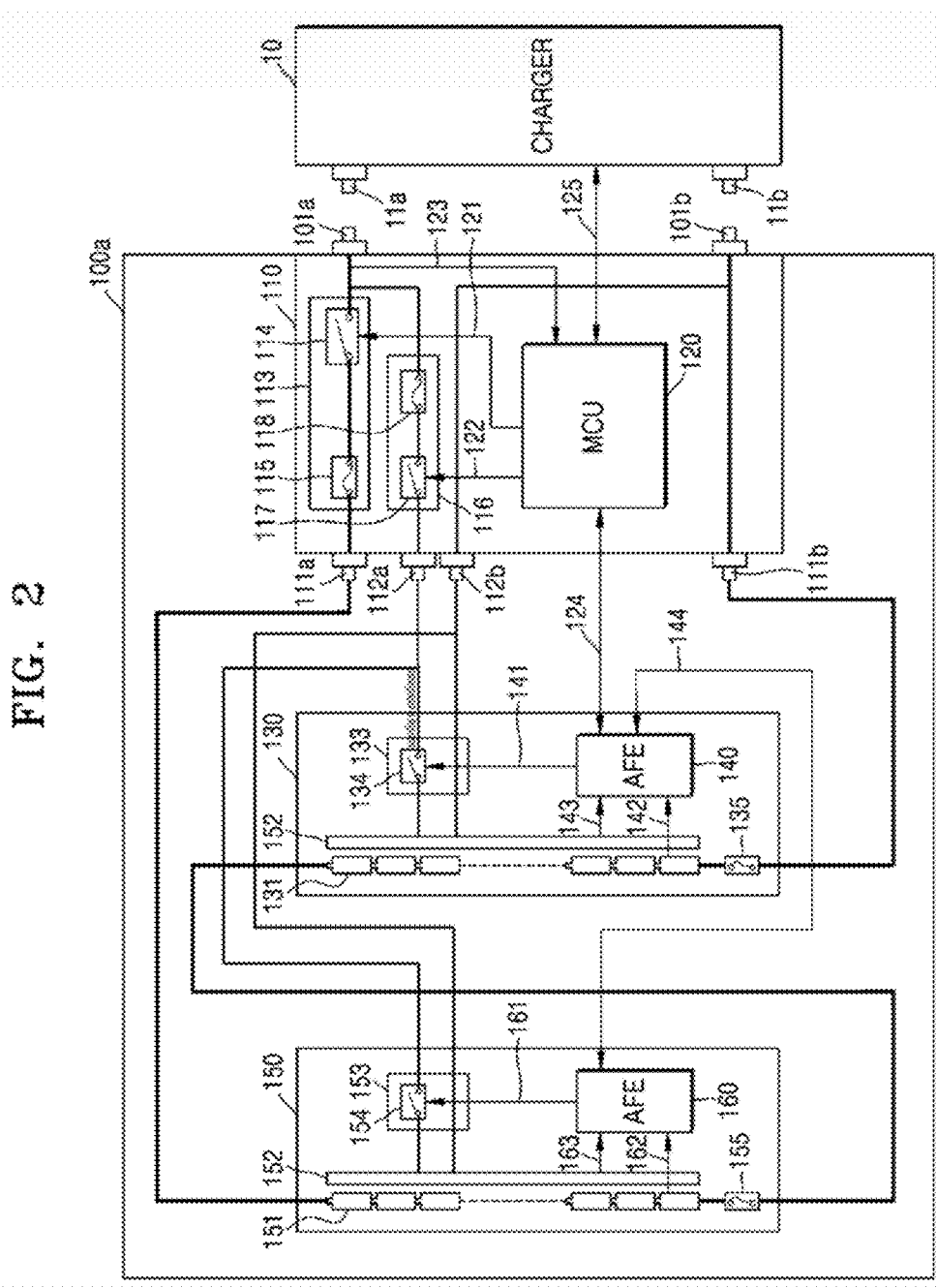
FIG. 2 illustrates a battery system according to another example embodiment.

FIG. 2 illustrates a battery system according to another example embodiment.

Referring to FIG. 2, a battery system 100a may include a battery management module 110, at least one battery modules 130 and 150, and controllers 120, 140, and 160. The battery system 100a is substantially the same as the battery system 100 of FIG. 1 except that the first and second battery modules 130 and 150 are connected in series. For the same components, a repeated description thereof may be omitted.

The first battery cells 131 of the first battery module 130 and the second battery cells 151 of the second battery module 150 may be connected between the battery terminals 111a and 111b in series. The charging voltage for charging the first and second battery cells 131 and 151 connected in series as described above may be about twice as high as the charging voltage for charging the first and second battery cells 131 and 151 connected in parallel, as shown in FIG. 1. In the example embodiment of FIG. 1, when the voltage of the charging power and the voltage of the heating power are the same, according to the embodiment of FIG. 2, the voltage of the charging power may be about twice as the voltage of the heating power.

The microcontroller 120 may detect connection with the charger 10 through the second communication line 125. The microcontroller 120 may detect first and second cell temperatures of first and second battery cells through the first and second analog front ends 140 and 160. In this case, the main switch 114 may be in a turned off state.

When the first and second cell temperatures are lower than the first reference value, the microcontroller 120 may request the charger 10 to supply the heating voltage. The charger 10 may output the heating voltage to the external terminals 101a and 101b in response to the request of the microcontroller 120. The microcontroller 120 may detect the heating voltage applied to the external terminals 101a and 101b and then may turn on the heating switch 117. The microcontroller 120 may turn on the first and second control switches 134 and 154 through the first and second analog front ends 140 and 160, thereby supplying the heating power from the charger 10 to the first and second heating elements 132 and 152.

When the first and second cell temperatures are increased by the first and second heating elements 132 and 152 and the first and second cell temperatures are higher than the second reference value, the microcontroller 120 may turn off the heating switch 117 and may request the charger 10 to supply the charging power. The charger 10 may output the charging voltage to the external terminals 101a and 101b in response to the request of the microcontroller 120. The microcontroller 120 may detect the charging voltage applied to the external terminals 101a and 101b and then may turn on the main switch 114, thereby supplying charging power from the charger 10 to the first and second battery cells 131 and 151.

According to the present example embodiment, even when the charging voltage and the heating voltage are different from each other, as communication is performed between the microcontroller 120 and the charger 10, after the temperature of the first and second battery cells 131 and 151 are safely increased to be higher than the second reference value, the first and second battery cells 131 and 151 may be charged.

Figure 3:
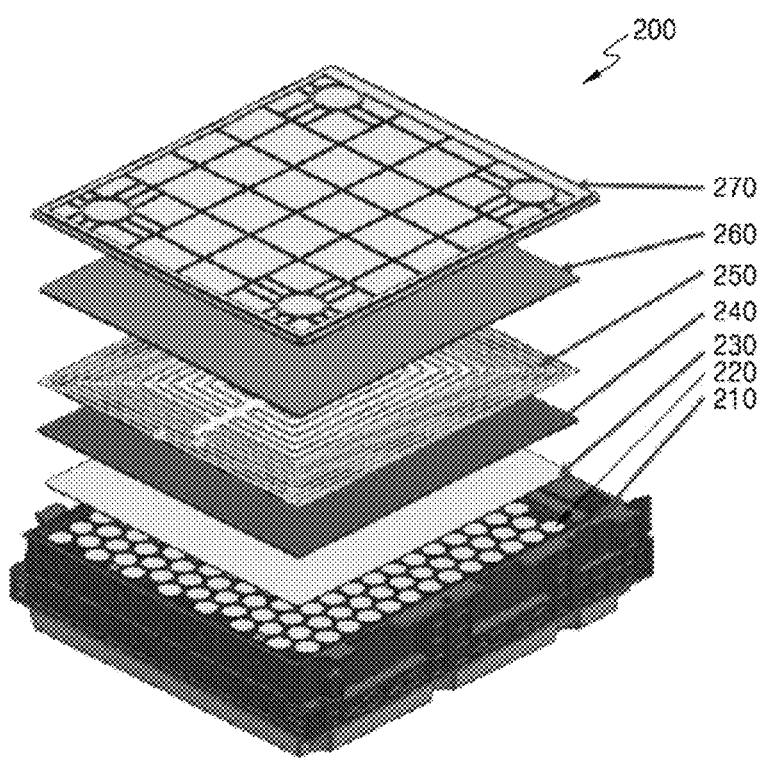
FIG. 3 illustrates a battery module according to an example embodiment.

FIG. 3 illustrates a battery module according to an example embodiment.

Referring to FIG. 3, a battery module 200 may include a battery body case 210, battery cells 220, a thermal pad 230, a thermal plate 240, a film heater 250, an insulator 260, and a cover case 279. The battery module 200 may correspond to the first and second battery modules 130 and 150 of FIGS. 1 and 2.

The battery body case 210 and the cover case 270 may protect the battery cells 220 and a protection circuit, and the like from external shock, moisture, and the like. The protection circuit may be mounted on the battery body case 210. The protection circuit may include an analog front end, a current and temperature sensor, a cell balancing circuit, a communication terminal, and the like. The protection circuit may be mounted on a circuit board fixed to the battery body case 210. The battery cells 220 may be arranged in the battery body case 210, and the battery cells 220 may correspond to the firsts and second battery cells 131 and 151 of FIGS. 1 and 2.

The thermal pad 230 may be arranged on the battery cells 220. The thermal pad 230 may transfer heat generated in the film heater 250 to the battery cells 220. The thermal pad 230 may dissipate heat generated in the battery cells 220 to the outside. The thermal pad 230 may insulate the film heater 250 and the battery cells 220 from each other. A thermal glue instead of the thermal pad 230 may also be used.

The thermal plate 240 may be arranged on the thermal pad 230. The thermal plate 240 may fix the film heater 250 and may diffuse heat generated in the film heater 250 to the battery cells 220.

The film heater 250 may be arranged on the thermal plate 240. The film heater 250 may include a heating element pattern arranged on the insulating film. When the heating voltage is applied to the heating element pattern, heat may be emitted so that the temperature of the battery cells 220 may be increased. As shown, the battery cells 220 may be arranged adjacent to the film heater 250. The film heater 250 may correspond to the first and second heating elements 132 and 152 of FIGS. 1 and 2. The film heater 250 will be described in more detail below with reference to FIGS. 4 and 5.

The insulator 260 may be arranged on the film heater 250. The insulator 260 may prevent heat generated from the film heater 250 from being lost to the outside. The cover case 270 may be arranged on the insulator 260. The cover case 270 may be coupled to the battery body case 210 by plastic laser welding.

Figure 4A:
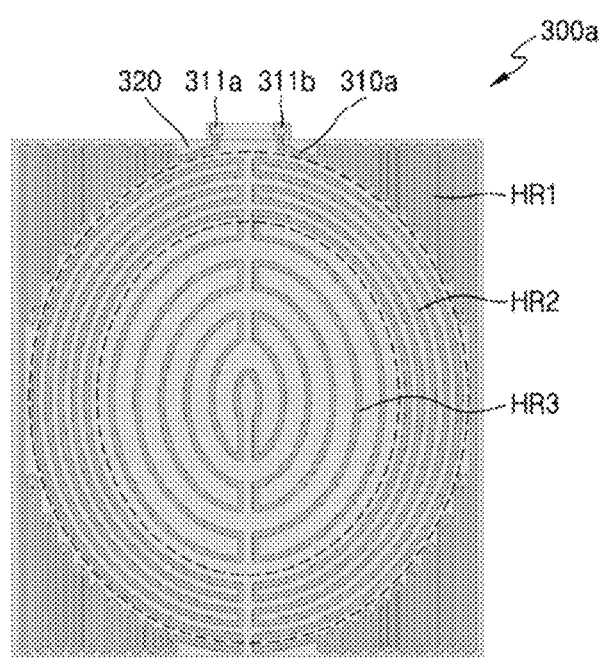
FIG. 4A illustrates a film heater according to an example embodiment.

FIG. 4A illustrates a film heater according to an example embodiment.

Referring to FIG. 4A, a film heater 300a may include an insulating film 320, and a heating element pattern 310a arranged on the insulating film 320 to have a desired heating size. Connection terminals 311a and 311b, to which the heating voltage may be applied, may be arranged on both ends of the heating element pattern 310a.

The insulating film 320 may include a plastic film made of one or more plastic materials selected from, e.g., polyethylene terephthalate (PET), polyimide (PI), poly acrylonitrile (PAN), polyurethane (PU), silicon, polycarbonate (PC), Teflon, liquid crystal polymer (LCP), poly ether ether ketone (PEEK), polyethersulphone (PES), polyacrylate (PAR), polyetherimide (PEI), polyethylene naphthalate (PEN), polyphenylene sulfide (PPS), polyallylate, cellulose triacetate (CTA), and cellulose acetate propionate (CAP).

The heating element pattern 310a may be a planar heating element having a small width. The heating element pattern 310a may have a substantially constant width according to a longitudinal direction. According to another example, the heating element pattern 310a may have different widths according to the longitudinal direction so that a heating value per unit area of a certain region may be differently set when the same current flows through the heating element pattern 310a.

The planar heating element may be formed using, e.g., a ceramic resistor. The planar heating element may be, e.g., a carbon-based heating element and may be formed of a material such as a carbon pulp heating paper, a carbon fiber yarn woven heating element, or a carbon cotton heating element. The planar heating element may be formed by, e.g., weaving a fine metal wire.

The heating element pattern 310a may be formed by printing a heating element composition on an upper surface of the insulating film 320. The heating element pattern 310a may be formed by printing the heating element composition on the upper surface of the insulating film 320, and then thermally curing and aging. As a printing method of the heating element composition, screen printing, gravure printing (or roll-to-roll gravure printing), comma coating (or roll-to-roll comma coating), flexo, imprinting, offset printing, etc., may be used. Curing may be performed at, e.g., 100° C. to 180° C., and aging may be performed at, e.g., 250° C. to 350° C.

According to an example, the heating element composition may include a mixed binder, conductive particles, an organic solvent, and a dispersant. The conductive particles may include silver powder and carbon nanotube particles and may further include graphite particles. The heating element composition may have a density of, e.g., 2 g/cm$^3$ or less. According to another example, the heating element composition may include a mixed binder, carbon particles, a metal powder, an organic solvent, and a dispersant. The carbon particles may include carbon nanotube particles and graphite particles. The heating element composition may be implemented in the form of paint, ink, or paste by controlling the amount of organic solvent used.

According to another example, the heating element pattern 310a may be formed of a conductive wire. The conductive wire may include at least a metal wire. The metal wire may be covered with a self-adhesive insulating film. For example, a metal wire such as copper, iron, gold, copper nickel, nickel chromium, iron nickel chromium, or the like may be used, but other materials may be used as long as they have conductivity. In consideration of electrical resistance, durability, and cost, copper or a copper alloy in which zinc, lead, tin, silver, aluminum, nickel, beryllium, zirconium, and the like are combined singly or in the plural, may be used as the metal wire.

The film heater 300a may have a plurality of heating regions HR1, HR2, and HR3 with different heating values per unit area. The third heating region HR3 may be defined adjacent to the center of the film heater 300a, and the heating element pattern 310a may be arranged so that the density of the heating element pattern 310a is low to have a lowest heating value per unit area, or the separation distance between adjacent linear patterns is large. The first heating region HR1 may be defined adjacent to the periphery of the film heater 300a, and the heating element pattern 310a may be arranged so that the density of the heating element pattern 310a is high to have a highest heating value per unit area, or the separation distance between adjacent linear patterns is small. The second heating region HR2 may be arranged between the first heating region HR1 and the third heating region HR3, and the heating element pattern 310a may be arranged to have a heating value that is less than that of the first heating region HR1 and greater than the third heating region HR3.

The film heater 300a may have a rectangular planer shape. The second and third heating regions HR2 and HR3 may have a circular planar shape, as shown in FIG. 4A. The film heater 300a may have a plurality of heating regions HR1, HR2, and HR3 with different heating values per unit area so that the temperature of battery cells arranged in the film heater 300a may be constantly increased.

Figure 4B:
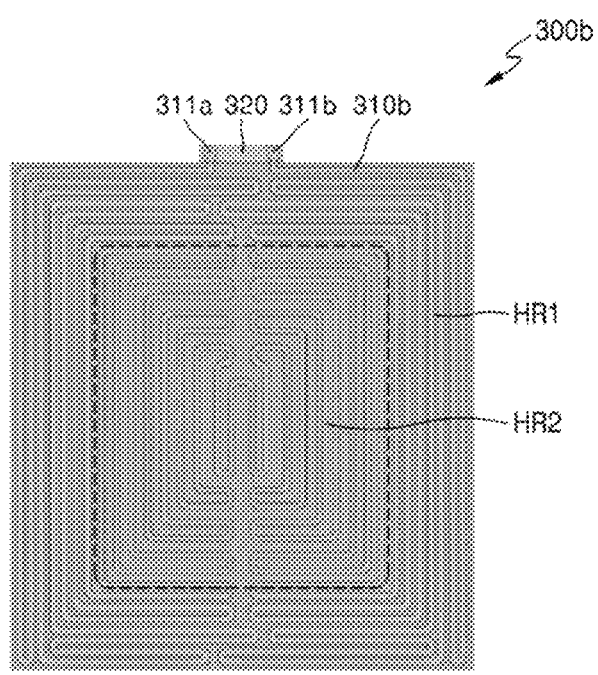
FIG. 4B illustrates a film heater according to another example embodiment.

FIG. 4B illustrates a film heater according to another example embodiment.

Referring to FIG. 4A, the film heater 300b may include an insulating film 320, and a heating element pattern 310b arranged to have a desired heating size on the insulating film 320. Connection terminals 311a and 311b, to which the heating voltage may be applied, may be arranged on both ends of the heating element pattern 310b. The film heater 300b may be substantially the same as the film heater 300a of FIG. 4A except for the planar shape of the heating element pattern 310b, and the same components will not be repeatedly described. A material for the heating element pattern 310b may be the same as the heating element pattern 310a of FIG. 4A.

The film heater 300b may have a plurality of heating regions HR1 and HR2 with different heating values per unit area. The first heating region HR1 may be defined adjacent to the periphery of the film heater 300b, and the heating element pattern 310b may be arranged so that the density of the heating element pattern 310b is high to have a highest heating value per unit area, a lower separation distance between adjacent linear patterns, or a width thereof is large. The second heating area HR2 may be defined adjacent to the center of the film heater 300b, and the heating element pattern 310b may be arranged so that the density of the heating element pattern 310b is low to have a lowest heating value per unit area, a large separation distance between adjacent linear patterns, or a width thereof is small.

The first and second heating regions HR1 and HR2 may have a rectangular planar shape to correspond to the planar shape of the film heater 300b, as shown in FIG. 4B. The film heater 300b may have a plurality of heating regions HR1 and HR2 with different heating values per unit area so that the temperature of battery cells arranged in the film heater 300b may be constantly increased.

FIGS. 5A through 5D illustrate heating elements according to example embodiments.

Figure 5A:
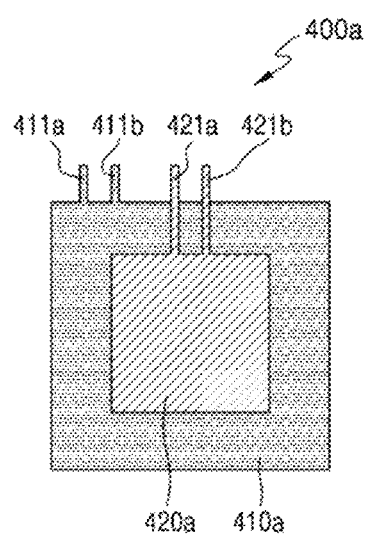
FIGS. 5A through 5D illustrate heating elements according to example embodiments.

Referring to FIG. 5A, a heating element 400a may include a first film heater 410a located on the periphery of the heating element 400a, and a second film heater 420a located inside the first film heater 410a. The first film heater 410a may surround the second film heater 420a. The first film heater 410a may include first connection terminals 411a and 411b, and the second film heater 420a may include second connection terminals 421a and 421b. A heating value applied to the first connection terminals 411a and 411b and a heating value applied to the second connection terminals 421a and 421b may be independent from each other. For example, heating power supplied to the first film heater 410a may be greater than heating power supplied to the second film heater 420a.

Figure 5B:
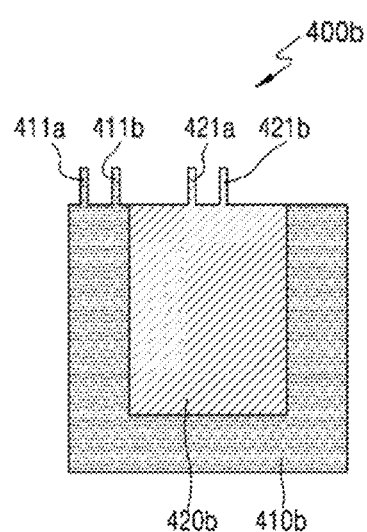

Referring to FIG. 5B, a heating element 400b may include a first film heater 410b located on the periphery of the heating element 400b, and a second film heater 420b located inside the first film heater 410b. The first film heater 410b may surround three edges of the second film heater 420b. The first film heater 410b may include first connection terminals 411a and 411b, and the second film heater 420b may include second connection terminals 421a and 421b. Heating power supplied to the first film heater 410b and heating power supplied to the second film heater 420b may be different from each other.

Figure 5C:
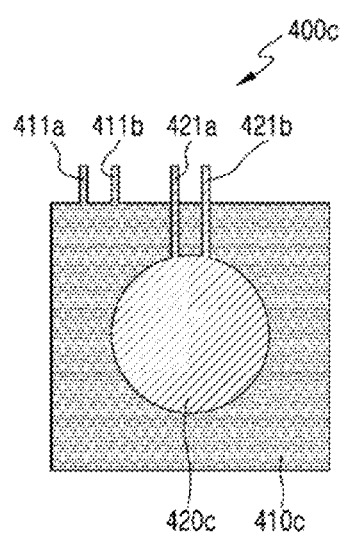

Referring to FIG. 5C, a heating element 400c may include a first film heater 410c located on the periphery of the heating element 400c, and a second film heater 420c surrounded by the first film heater 410c. The heating element 400c has a rectangular planar shape, but the second film heater 420c may have a circular planar shape. The first film heater 410c may include first connection terminals 411a and 411b, and the second film heater 420c may include second connection terminals 421a and 421b. The heating power supplied to the first film heater 410c and the heating power supplied to the second film heater 420c may be different from each other.

Figure 5D:
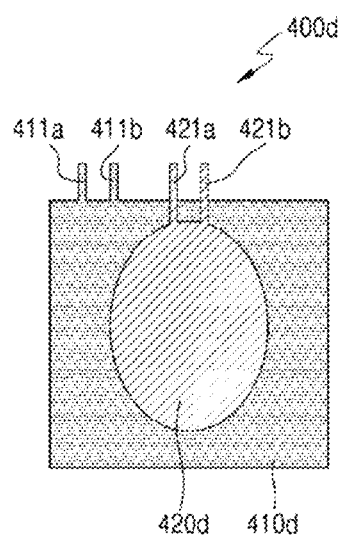

Referring to FIG. 5D, a heating element 400d may include a first film heater 410d located on the periphery of the heating element 400d, and a second film heater 420d having an elliptical planar shape and surrounded by the first film heater 410d. The first film heater 410d may include first connection terminals 411a and 411b, and the second film heater 420d may include second connection terminals 421a and 421b. The heating power supplied to the first film heater 410d and the heating power supplied to the second film heater 420d may be different from each other.

Figure 6:
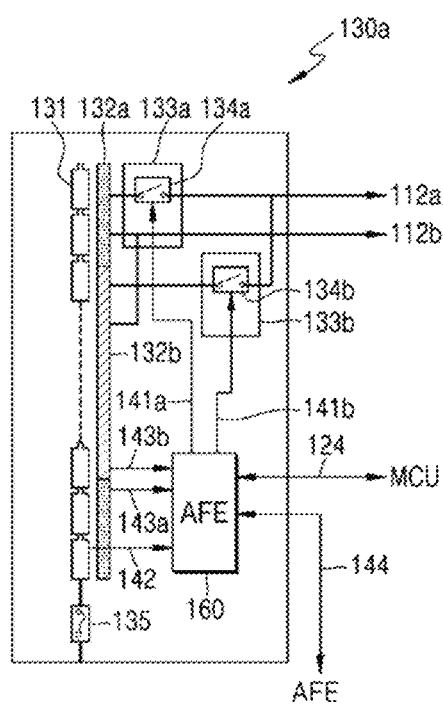
FIG. 6 illustrates a battery module including the heating element of FIGS. 5A through 5D, according to an example embodiment.

FIG. 6 illustrates a battery module including the heating element of FIGS. 5A through 5D according to an example embodiment.

Referring to FIG. 6, a battery module 130a may include at least one first battery cell 131, a first film heater 132a and a second film heater 132b, a first control switch 134a between the first film heater 132a and the heating terminal 112a, a second control switch 134b between the second film heater 132b and a heating terminal 112a, and a first analog front end 140 that outputs a first control signal 141a to the first control switch 134a and outputs a second control signal 141b to the second control switch 134b.

In the battery module 130a, when compared with the first battery module 130 of FIG. 1, the battery module 130a is substantially the same as the first battery module 130 of FIG. 1 except that the first and second film heaters 132a and 132b instead of the first heating element 132 are use and the first and second control switches 134a and 134b instead of the control switch 134 are used. A redundant description of the same components may be omitted.

The first analog front end 140 may independently output the first and second control signals 141a and 141b to the first and second control switches 134a and 134b, respectively. The first analog front end 140 may receive heater sensing data 143a from the first film heater 132a and may receive heater sensing data 143b from the second film heater 132b.

As shown in FIGS. 5A through 5D, a heating element including the first and second film heaters 132a and 132b may be used. Heating power may be independently supplied to the first and second film heaters 132a and 132b through the first and second control switches 134a and 134b, and the first and second control switches 134a and 134b may be controlled by the first and second control signals 141a and 141b.

The first and second control signals 141a and 141b may be pulse width modulation signals having a duty ratio. The second film heater 132b located inside the first heating element 132 may generate less heat than the first film heater 132a located on the periphery of the first heating element 132, and, correspondingly, the duty ratio of the first control signal 141a may be higher than the duty ratio of the second control signal 141b.

Figure 7:
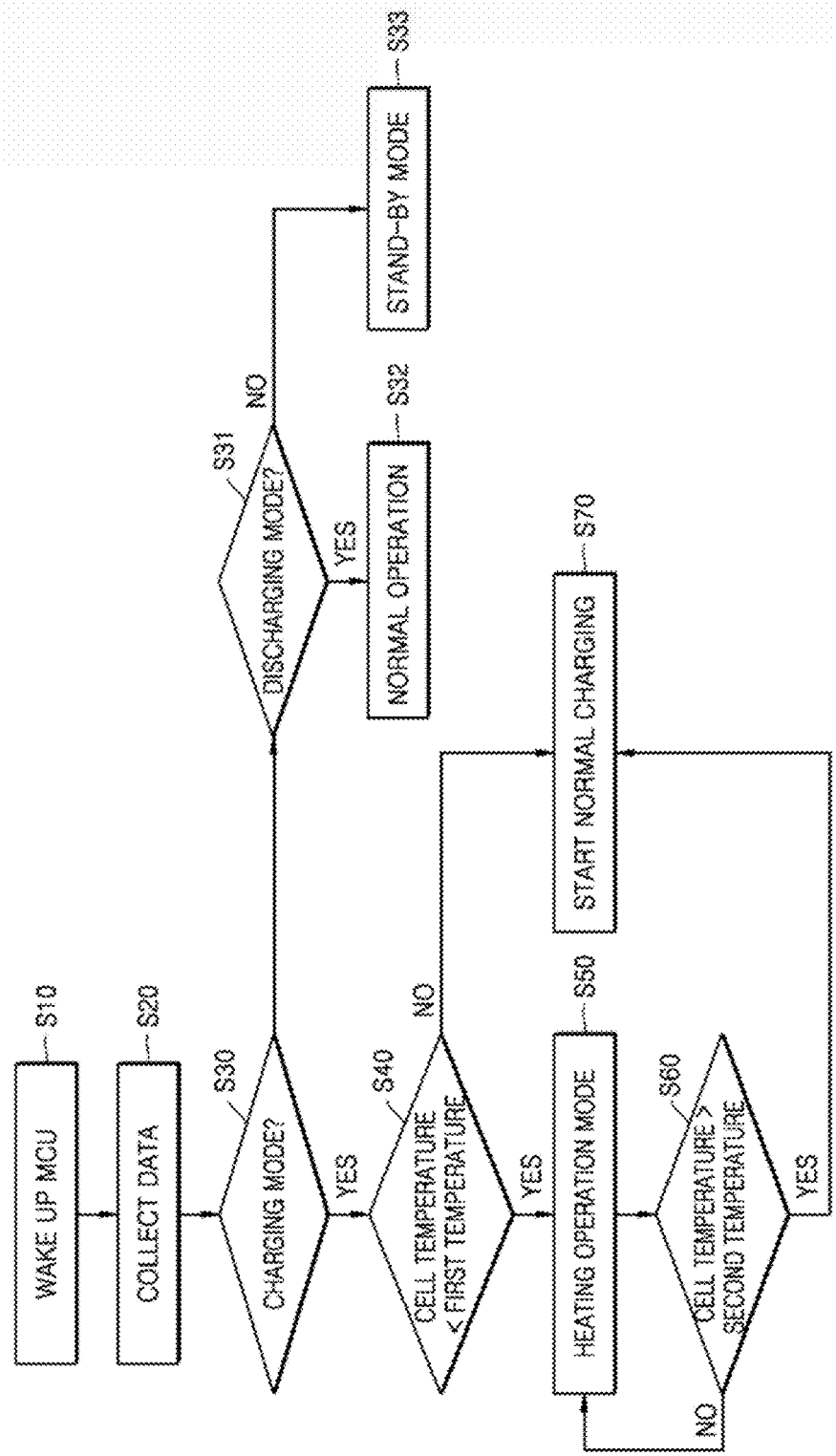
FIG. 7 is a flowchart for describing a method of controlling a battery system according to an example embodiment.

FIG. 7 is a flowchart for describing a method of controlling a battery system according to an example embodiment.

Referring to FIG. 7 with FIG. 1, the microcontroller 120 may be awakened (S10). According to an embodiment, the microcontroller 120 may be awakened in response to a wakeup signal output by the charger 10 through the second communication line 125, and may detect that the charger 10 has been connected to the microcontroller 120 through the second communication line 125. According to another example, the microcontroller 120 may be awakened in response to a voltage applied to the external terminals 101a and 101b. According to another example, the microcontroller 120 may be awakened in response to a user's input or a signal from another controller.

The microcontroller 120 may collect data (S20). For example, the microcontroller 120 may collect voltage values applied to the external terminals 101a and 101b through the sensing data 123, and collect charging and discharging current values input and output through the external terminals 101a and 101b. The microcontroller 120 may communicate with the first and second analog front ends 140 and 160 through the first and third communication lines 124 and 144, and may collect a cell voltage value and a first cell temperature value of the first battery cells 131, a current value and a heater temperature value of the first heating element 132, a cell voltage value and a second cell temperature value of the second battery cells 151, and a current value and a heater temperature value of the second heating element 152.

The microcontroller 120 may collect the voltage value applied to the external terminals 101a and 101b through the sensing data 123, and may detect that the charger 10 has been connected to the microcontroller 120 based thereon.

The microcontroller 120 may determine whether a current operation mode is a charging mode (S30).

When the current operation mode is not the charging mode, the microcontroller 120 may determine whether the current operation mode is a discharging mode (S31).

When the current operation mode is the discharging mode, the microcontroller 120 may perform a normal operation (S32). For example, the microcontroller 120 may turn on the main switch 114.

When the current operation mode is not the discharging mode, the microcontroller 120 may operate in a standby mode (S33).

Referring again to operation S30, when the current operation mode is the charging mode (S30-Yes), the microcontroller 120 may compare the first cell temperature value and the second cell temperature value with a first temperature (S40). The first temperature may be a first reference value, for example, 0 degrees Celsius.

The microcontroller 120 may operate in a heating operation mode when one of the first cell temperature value and the second cell temperature value is lower than the first temperature (S50). For example, the microcontroller 120 may turn off the main switch 114 and may turn on the heating switch 117. The microcontroller 120 may turn on the first and second control switches 134 and 154 through the first and second analog front ends 140 and 160, thereby supplying heating power from the charger 10 to the first and second heating elements 132 and 152. The first and second cell temperatures are increased by heat generated by the first and second heating elements 132 and 152.

The microcontroller 120 may compare the first cell temperature value and the second cell temperature value with a second temperature (S60). The second temperature may be a second reference value higher than the first temperature, for example, 5 degrees Celsius. The microcontroller 120 may perform a heating operation mode continuously when one of the first cell temperature value and the second cell temperature value is lower than the second temperature.

The microcontroller 120 may stop the heating operation mode and start charging normally when all of the first cell temperature value and the second cell temperature value are higher than the second temperature (S70).

Also, referring again to operation S40, the microcontroller 120 may skip the heating operation mode and start charging normally when all of the first cell temperature value and the second cell temperature value are higher than the first temperature (S70). The microcontroller 120 may be configured to turn off the heating switch 117 and turn on the main switch 114, thereby supplying charging power from the charger 10 to the first and second battery cells 131 and 151.

Figure 8:
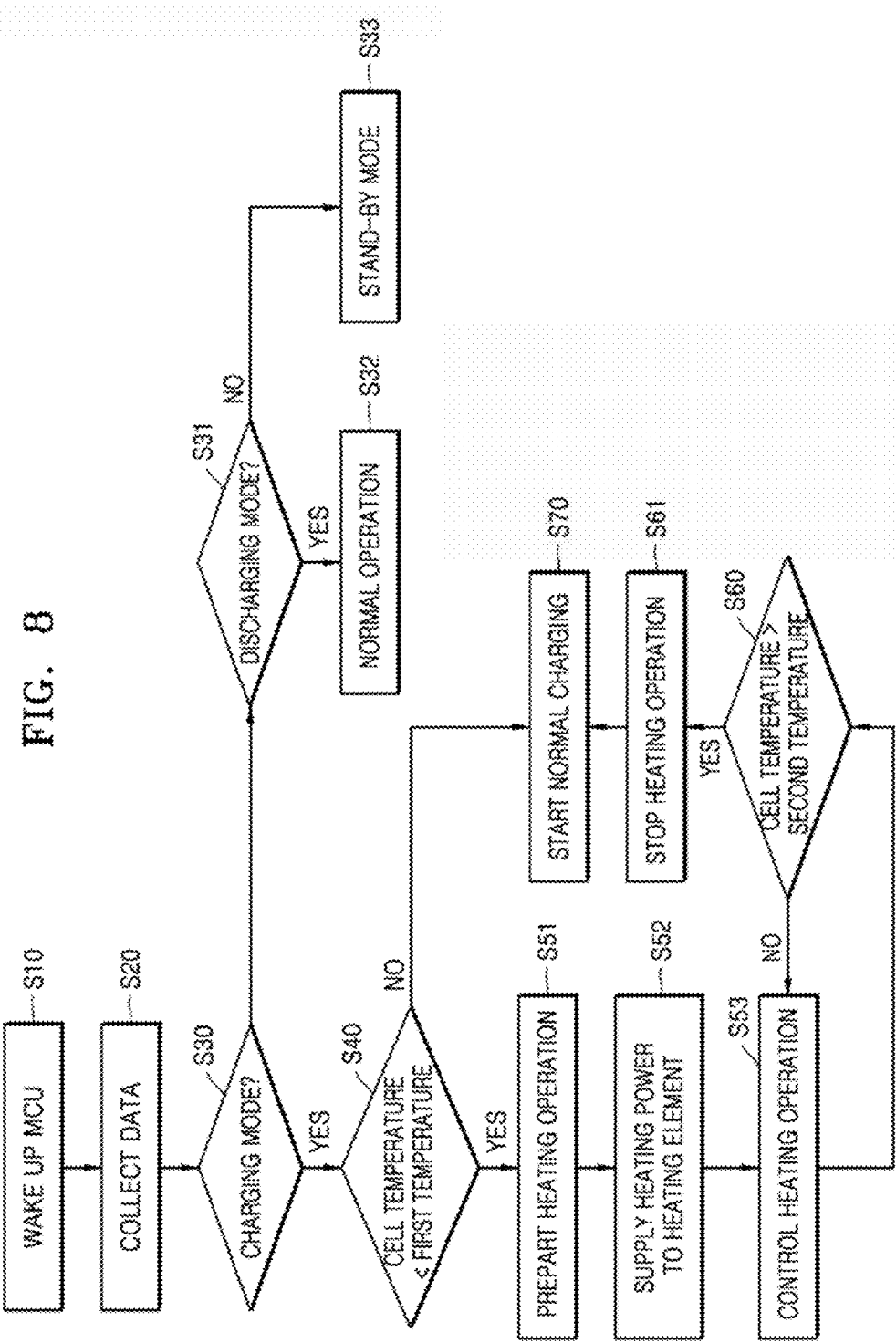
FIG. 8 is a flowchart for describing a method of controlling a battery system according to another example embodiment.

FIG. 8 is a flowchart for describing a method of controlling a battery system according to another example embodiment.

Referring to FIG. 8 with FIG. 1, the microcontroller 120 may perform operations S10 through S40 described above with reference to FIG. 7.

The microcontroller 120 may prepare a heating operation when one of the first cell temperature value and the second cell temperature value is lower than the first temperature (S51). For example, the microcontroller 120 may turn off the main switch 114 and request the charger 10 to supply a heating voltage through the second communication line 125. The charger 10 may output the heating voltage to the external terminals 101a and 101b in response to the request of the microcontroller 120. When the heating voltage applied to the external terminals 101a and 101b are detected, the microcontroller 120 may turn on the heating switch 117. The microcontroller 120 may turn on the first and second control switches 134 and 154 through the first and second analog front ends 140 and 160, thereby supplying heating power from the charger 10 to the first and second heating elements 132 and 152 (S52).

The microcontroller 120 may control the heating operation based on the first cell temperature and the second cell temperate (S53). The first and second analog front ends 140 and 160 may output the first and second control signals 141 and 161 having a duty ratio so as to control the first and second control switches 134 and 154. For example, the first cell temperature may not have reached the second temperature; when the second cell temperature reaches the second temperature first, the duty ratio of the second control signal 161 may be reduced. In this case, the duty ratio of the second control signal 161 may be lower than the duty ratio of the first second signal 141. According to another example, the microcontroller 120 may adjust the duty ratio of the first and second control signals 141 and 161 based on the first cell temperature and the second cell temperature. For example, the microcontroller 120 may reduce the duty ratio of the first and second control signals 141 and 161 as the first cell temperature and the second cell temperature are increased. The first and second cell temperatures may be increased by heat generated by the first and second heating elements 132 and 152.

The microcontroller 120 may compare the first cell temperature value and the second cell temperature value with the second temperature (S60). The microcontroller 120 may control the heating operation continuously when one of the first cell temperature value and the second cell temperature is lower than the second temperature (S53).

The microcontroller 120 may stop the heating operation when all of the first cell temperature value and the second cell temperature value are higher than the second temperature (S61). The microcontroller 120 may check whether all of the first cell temperature value and the second cell temperature value are maintained to be higher than the second temperature for a preset time (e.g., one minute). When all of the first cell temperature value and the second cell temperature value are maintained to be higher than the second temperature for a preset time (for example, one minute), the microcontroller 120 may turn off the first and second control switches 134 and 154 through the first and second analog front ends 140 and 160. The microcontroller 120 may turn off the heating switch 117 and may request the charger 10 to supply charging power through the second communication line 125. The charger 10 may output a charging voltage to the external terminals 101a and 101b in response to the request of the microcontroller 120. The microcontroller 120 may detect the charging voltage applied to the external terminals 101a and 101b and then may turn on the main switch 114, thereby supplying the charging power from the charger 10 to the first and second battery cells 131 and 151 so as to start normal charging (S70).

Referring again operation S40, when all of the first cell temperature value and the second cell temperature value are higher than the first temperature, the microcontroller 120 may turn off the heating switch 117 and may request the charger 10 to supply the charging power through the second communication line 125. The charger 10 may output the charging voltage to the external terminals 101a and 101b in response to the request of the microcontroller 120. The microcontroller 120 may detect the charging voltage applied to the external terminals 101a and 101b and then may turn on the main switch 114, thereby supplying the charging power from the charger 10 to the first and second battery cells 131 and 151 so as to start normal charging (S70).

By way of summation and review, due to the characteristics of the lithium-ion battery, the deterioration of the battery may be accelerated when the battery is rapidly charged in a low temperature environment.

As described above, after a cell temperature is increased by using power supplied from a charger, a battery may be charged so that a battery system capable of fast charging even in a low temperature environment can be provided.

Herein, for the sake of brevity, conventional electronics, control systems, software development and other functional aspects of the systems may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context, and are not limited to the order in which the steps are described. The use of any and all examples, or example language (e.g., "such as") provided herein, is intended merely to better illuminate the embodiments and does not pose a limitation on the scope of the embodiments unless otherwise claimed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system, comprising:
   a battery management module including an external terminal, a battery terminal, a heating terminal, a main switch between the external terminal and the battery terminal, and a heating switch between the external terminal and the heating terminal;
   at least one battery module including at least one battery cell connected to the battery terminal, a heating element, and a control switch between the heating element and the heating terminal; and
   a controller configured to detect connection with a charger, and to detect a cell temperature of the at least one battery cell, wherein:
      when the cell temperature is lower than a first reference value, the controller is to turn off the main switch and turn on the heating switch and the control switch to supply heating power from the charger to the heating element, and
      when the cell temperature is higher than a second reference value, the controller is to turn off the heating switch and turn on the main switch to supply charging power from the charger to the at least one battery cell, wherein the controller includes:
   a microcontroller mounted on the battery management module and configured to control the main switch and the heating switch; and
   at least one analog front end respectively mounted on the at least one battery module and configured to detect the cell temperature, transmit the detected cell temperature to the microcontroller, and output a control signal to the control switch according to control of the microcontroller.

2. The battery system as claimed in claim 1, wherein:
   the control signal is a pulse width modulation signal, and
   the microcontroller is configured to determine a duty ratio of the control signal according to the cell temperature.

3. The battery system as claimed in claim 2, wherein the at least one battery module includes:
   a first battery module including at least one first battery cell, a first heating element, and a first control switch between the first heating element and the heating terminal; and
   a second battery module including at least one second battery cell, a second heating element, and a second control switch between the second heating element and the heating terminal.

4. The battery system as claimed in claim 3, wherein:
   the at least one first battery cell and the at least one second battery cell are connected to each other in series,
   the controller is configured to request the charger to supply a heating voltage when one of a first cell temperature of the at least one first battery cell and a second cell temperature of the at least one second battery cell is lower than the first reference value, and
   the controller is configured to request the charger to supply a higher charging voltage than the heating voltage when all of the first cell temperature and the second cell temperature are higher than the second reference value.

5. The battery system as claimed in claim 4, wherein, when the first cell temperature of the at least one first battery cell reaches the second reference value and the second cell temperature of the at least one second battery cell is lower than the second reference value, the controller is configured to output a first control signal having a first duty ratio to the first control switch and output a second control signal having a second duty ratio higher than the first duty ratio to the second control switch.

6. The battery system as claimed in claim 1, wherein the second reference value is equal to or higher than the first reference value.

7. The battery system as claimed in claim 1, wherein:
   the heating element is a film heater having a plurality of regions with different heating values per unit area, and
   the at least one battery cell includes a plurality of battery cells arranged on the film heater.

8. The battery system as claimed in claim 7, wherein a heating value per unit area of a central region of the film heater is lower than a heating value per unit area of an edge region of the film heater.

9. The battery system as claimed in claim 1, wherein:
   the heating element includes a first film heater, and a second film heater that surrounds at least a portion of the first film heater,
   the at least one battery module includes a first control switch between the first film heater and the heating terminal, and a second control switch between the second film heater and the heating terminal, and
   the controller is configured to output a second control signal having a higher duty ratio than a duty ratio of a first control signal output to the first control switch, to the second control signal.

10. A method of controlling the battery system as claimed in claim 1, the method comprising:
    detecting a connection with a charger;
    detecting a cell temperature of the at least one battery cell;
    when the cell temperature is lower than the first reference value, operating the controller to turn off the main switch and turn on the heating switch and the control switch so as to supply the heating power from the charger to the heating element; and
    when the cell temperature is higher than the second reference value, operating the controller to turn off the heating switch and turn on the main switch so as to supply the charging power from the charger to the at least one battery cell
    controlling, by a microcontroller, the main switch and the heating switch;

transmitting, by at least one analog front end, the detected cell temperature to the microcontroller and outputting a control signal to the control switch according to control of the microcontroller.

11. The method as claimed in claim 10, wherein the supplying of the heating power from the charger to the heating element includes:

detecting the cell temperature that is lower than the first reference value;

turning off the main switch;

requesting the charger to output a heating voltage;

detecting the heating voltage applied to the external terminal;

turning on the heating switch; and adjusting a duty ratio of a control signal for controlling the control switch.

12. The method as claimed in claim 10, wherein the supplying of the charging power from the charger to the at least one battery cell includes:

detecting that the cell temperature is maintained to be higher than the second reference value for a preset time;

turning off the heating switch;

requesting the charger to output a charging voltage;

detecting the charging voltage applied to the external terminal; and turning on the main switch.

\* \* \* \* \*